United States Patent [19]
Knoy et al.

[11] 3,762,559
[45] Oct. 2, 1973

[54] FILTER BOTTOM AND MOLDED MODULE THEREFOR
[75] Inventors: Maurice G. Knoy; Louis M. Alt; William M. Work, all of Lafayette, Ind.
[73] Assignee: Rostone Corporation, Lafayette, Ind.
[22] Filed: July 17, 1972
[21] Appl. No.: 272,394

[52] U.S. Cl. .............................................. 210/293
[51] Int. Cl. ............................................ B01d 23/18
[58] Field of Search ............ 210/291–293, 488, 498

[56] References Cited
UNITED STATES PATENTS

| | | | |
|---|---|---|---|
| 3,498,462 | 3/1970 | Larrowe et al. | 210/293 X |
| 3,456,804 | 7/1969 | McGivern | 210/293 |
| 3,024,913 | 3/1962 | Edmunds | 210/293 |
| 2,155,964 | 4/1939 | Bowers et al. | 210/292 |
| 1,151,313 | 8/1915 | Wheeler | 210/293 |

FOREIGN PATENTS OR APPLICATIONS

| | | | |
|---|---|---|---|
| 500,378 | 9/1939 | Great Britain | 210/293 |
| 956,826 | 4/1964 | Great Britain | 210/293 |

Primary Examiner—Samih N. Zaharna
Assistant Examiner—Robert H. Spitzer
Attorney—Thomas P. Jenkins et al.

[57] ABSTRACT

A preferred filter bottom module is molded of high strength plastic resin in a configuration which permits it to withstand the weight of the filter bed, and when bolted down, to withstand the backwash pressure. The module has a reinforced structural floor section formed with a horizontal wall and a network of intersecting vertical ribs, and has supporting legs at its corners and at intermediate points, each provided with shoulders to engage hold-down bolts. The modules are formed at their sides to interlock and be sealed to each other by sealing compound. Molded nozzles are uniformly distributed over the floor section to pass filtered water and distribute backwash water. Each nozzle includes low-velocity distribution apertures directed laterally, and desirably includes a restricted control orifice to equalize backwash flow among the several nozzles. Either the apertures or orifices are molded into the module, and the others thereof are either molded or installed in inserts. Various nozzle configurations may be used. The modules are light weight and may weigh only about 10 percent of corresponding concrete structures. For example, 4-foot by 4-foot module may weigh only about 100 lbs or less so as to be easily installed with minimum labor.

A modified module has a molded floor section with nozzles therein as above, supported by side walls and closed by a bottom pan to form a closed conduit unit. Such units are laid side-by-side and sealed end-to-end to form water distribution chambers; and may be held down by the weight of the filter bed or by adhesives.

49 Claims, 34 Drawing Figures

PATENTED OCT 2 1973

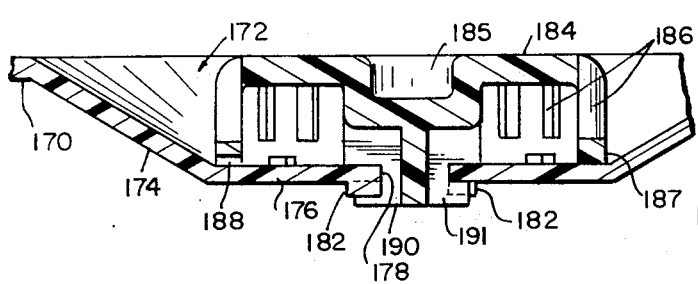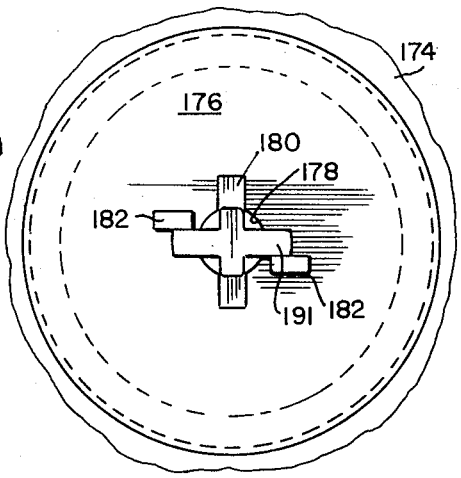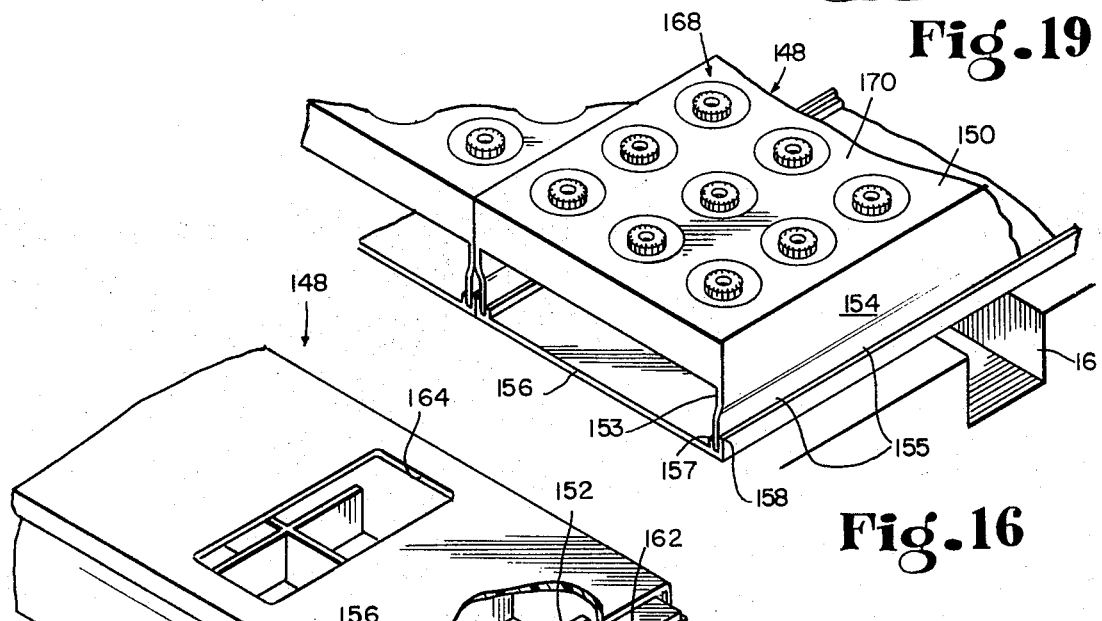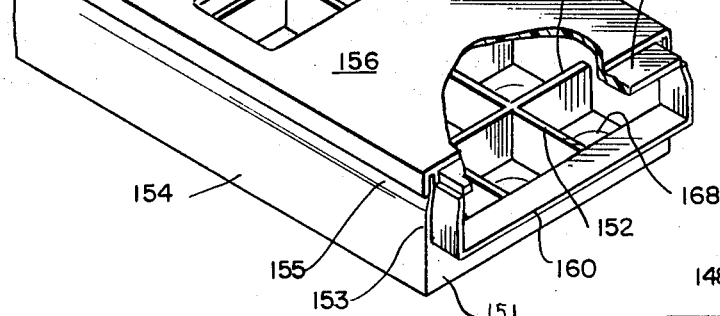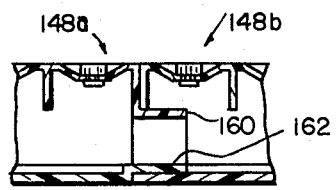
Fig. 18
Fig. 19
Fig. 16
Fig. 17
Fig. 16a

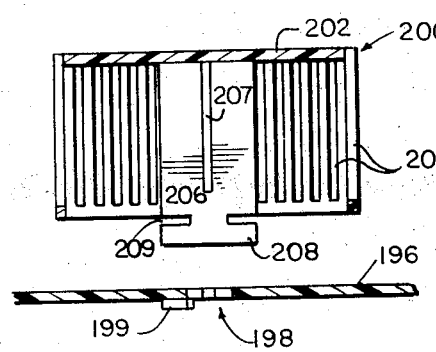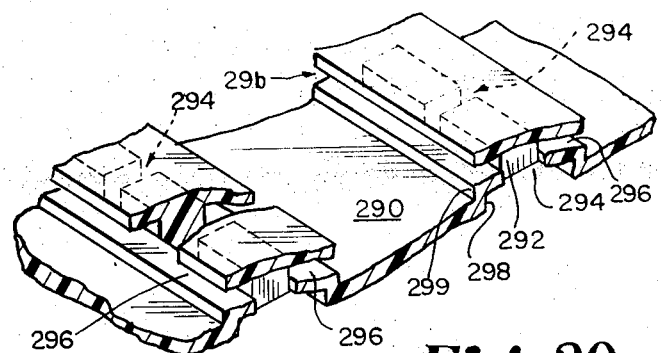
Fig.20     Fig.30
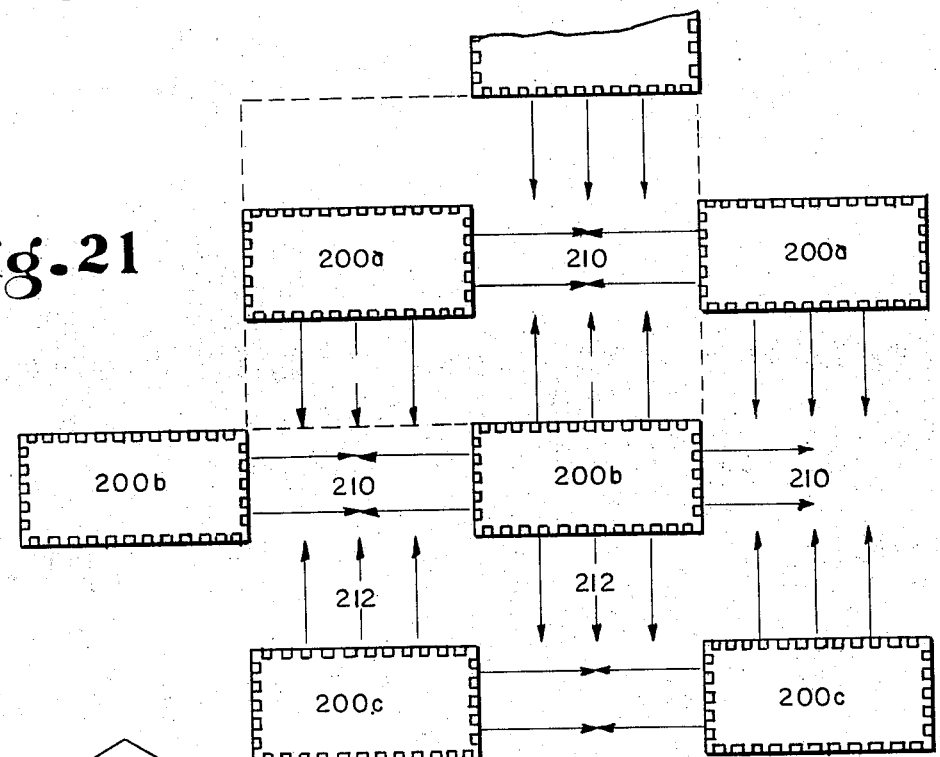
Fig.21
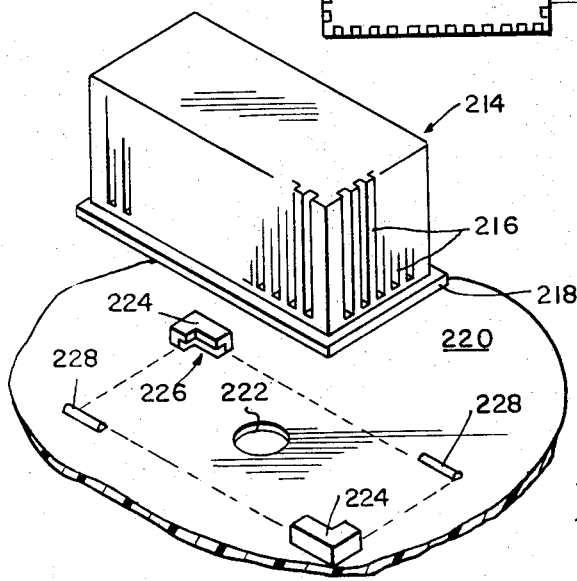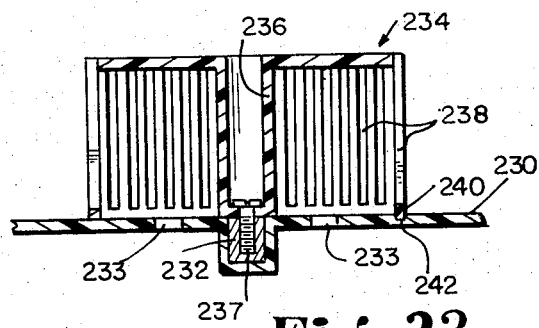
Fig.22     Fig.23

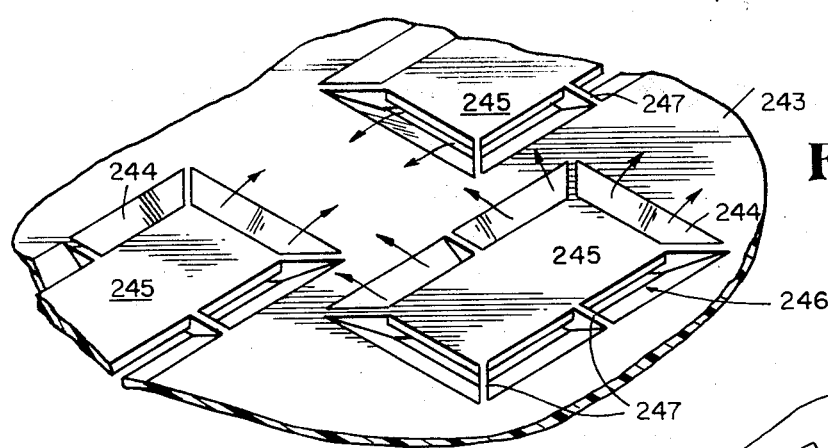
Fig.24
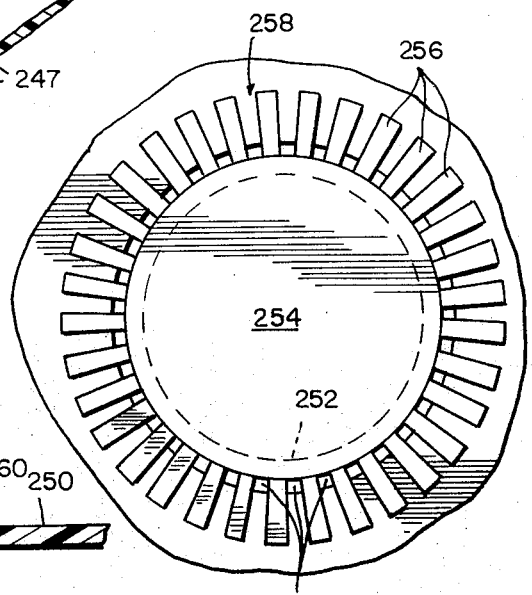
Fig.25
Fig.26
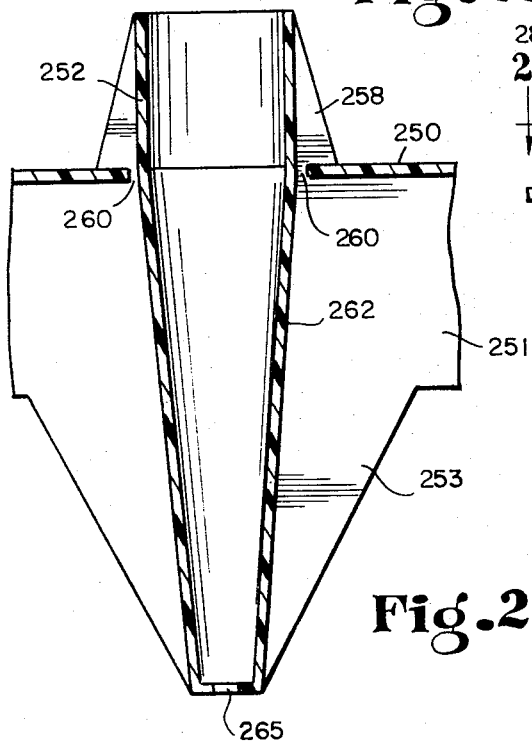
Fig.27
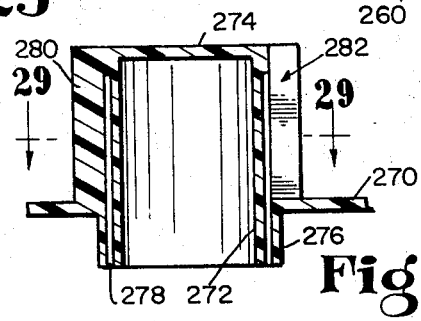
Fig.28
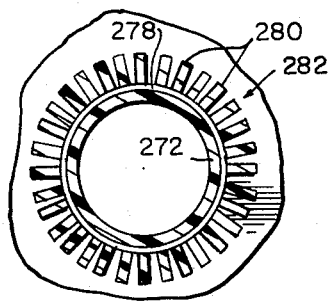
Fig.29

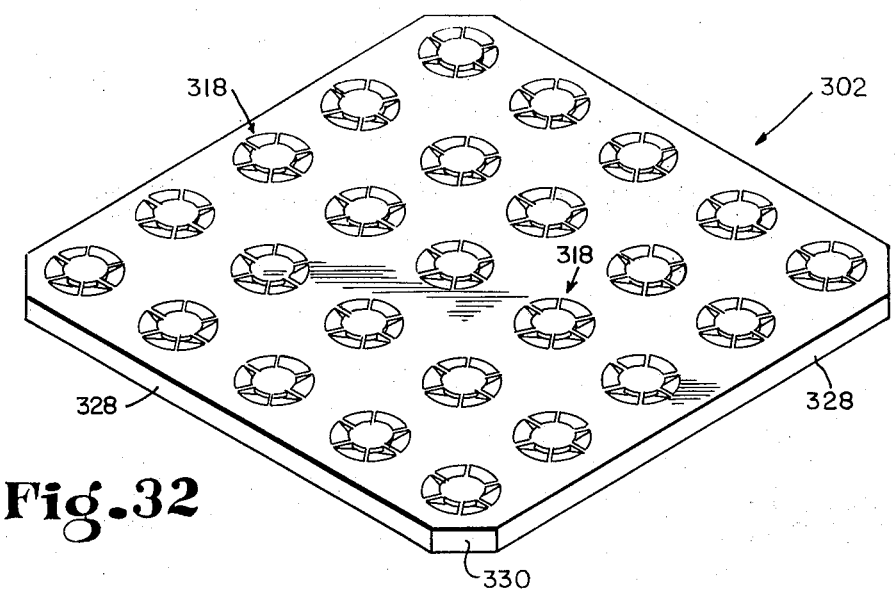
Fig.32
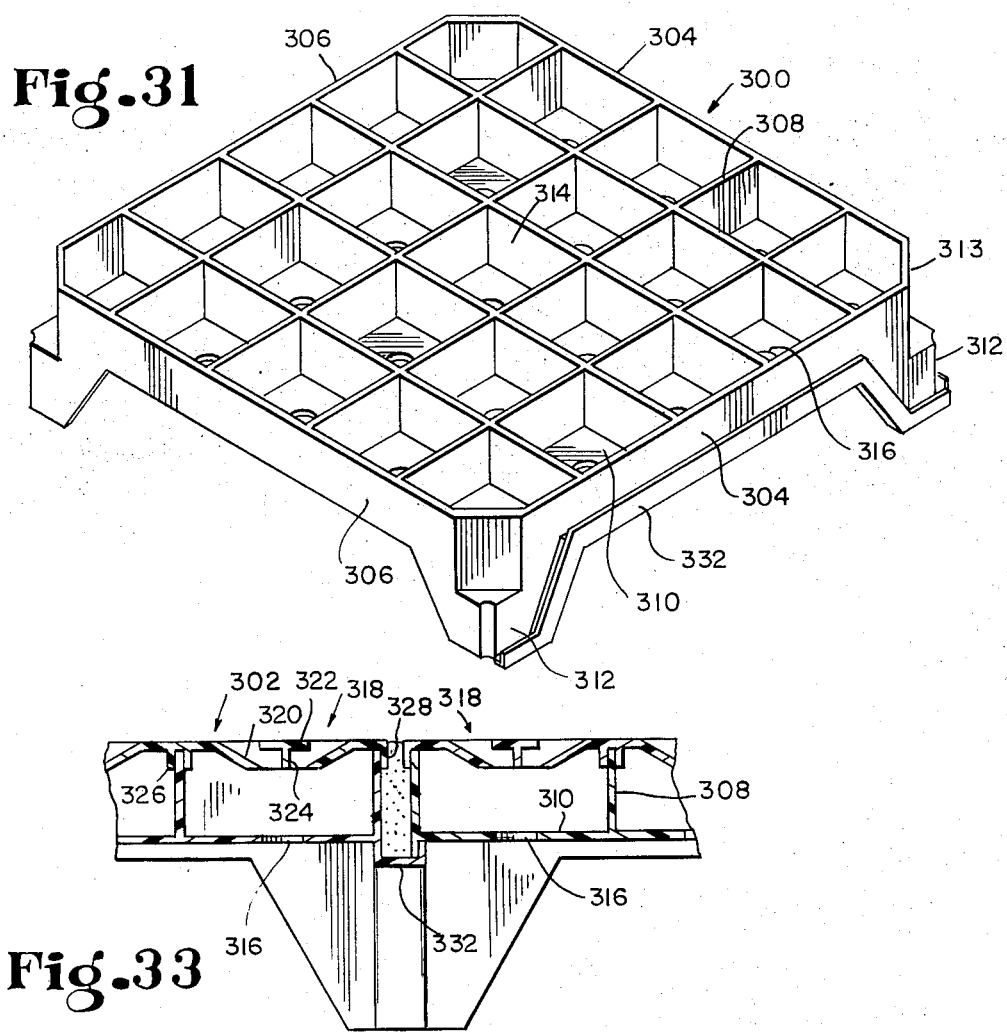
Fig.31
Fig.33

FILTER BOTTOM AND MOLDED MODULE THEREFOR

BACKGROUND OF THE INVENTION

Filters of the type to which this invention relates comprise a large concrete filter tank containing a false bottom — "filter bottom" — provided with a carefully designed pattern of openings for the downward passage of filtered water and the upward passage of backwash water. The filter bottom must have sufficient strength to withstand the weight of the filter bed consisting of layers of gravel and sand. For effective backwashing, water (or a mixture of water and air) is forced upward through the filter bottom and filter bed in sufficient volume and velocity to fluidize and cleanse the bed. Backwash flow must have even distribution and velocity both for uniform cleansing and especially to avoid channeling and blowholes. For obtaining equalized volume and velocity of flow at all parts of the filter bottom, it is generally desirable to provide freely open water passages below the filter bottom, and to cause the backwash water to pass from such distribution passages through a pattern of uniformly sized control orifices distributed over the entire area of the filter bottom below the filter bed. The restricted orifices maintain sufficient back pressure to ensure equal pressure and flow at all orifice locations. In each nozzle, water desirably passes from the control orifice through diversion or diffusion channels leading to large-area distribution apertures at which the water enters the filter bed at relatively low velocity. See Wheeler U.S. Pat. No. 1,151,313. It is of course necessary for all water openings to be of proper size to prevent clogging during the life of the filter.

In the past, filter bottoms have commonly been formed by pouring concrete in elaborate and complex molds or by installing heavy precast slabs on piers in the bottom of the filter tank, by forming control orifices and receptacles in the concrete structure, and by installing diffusion devices in the receptacles after the concrete structure has set. For example, see McGivern U.S. Pat. No. 3,456,804. Such installations are laborious, slow, and expensive.

The present invention provides a filter bottom module, which can be prefabricated in complete form in advance, and made in large sizes of low weight, so as to permit speedy and convenient installation with greatly reduced labor and expense. The modules are molded of high-strength reinforced plastic in a configuration which facilitates installation and provides adequate strength to support the filter bed and withstand backwash pressures. Each module has a horizontal structural floor section formed with a horizontal wall integrally reinforced by vertical sidewalls and a network of reinforcing ribs, and has molded supporting legs or walls at its corners or sides and, if desired, at intermediate points. A square 4-foot by 4-foot module may have legs on 2-foot centers. Its side walls are desirably formed to interlock with each other and define grooves for the reception of grout or other sealing compound. The modules may be formed to permit the installation of bolts or other hold-down fasteners, preferably at each leg, to secure the modules to the bottom wall of the tank to hold them down against the upward pressure of backwash operations.

An alternate form of module has a structural floor section of say 2-foot width supported on deep side walls fixed at their bottom edges to a closure pan. This forms a conduit section which may be used without hold-down bolts or may be fastened down with adhesive.

Each module is formed with a pattern of nozzles to pass filter water downward and to distribute backwash pressure upward at points uniformly distributed over the filter bottom. Each nozzle may include a bottom control orifice to admit water from below the module and a plurality of upper distribution apertures connected to the control orifices by diffusion passages to distribute backwash water at low velocity to the filter bed. Either or both of the control orifices and the distribution apertures may be molded in as the module is formed, and the other of such openings may be provided by inserts installed in the molded module. The nozzles may be of various types and configurations.

The modules may be molded of any of a variety of corrosion-resistant molding compositions within the skill of the art, including thermoplastic resins, thermosetting resins, and mixtures of thermoplastic and thermosetting resins. The compositions may contain reinforcing fibers such as glass fibers, and may contain other fillers such as silica and hydrated alumina. Such fibers and fillers are especially desirable in thermosetting resins, and may be used in quantities of from 50 to 75 percent of the composition, with from 25 to 50 percent resin. With thermoplastic resins, the amount of such fibers and fillers may vary from zero percent to 40 percent, with a resin content of from 60 to 100 percent. Different methods of forming may be used. A preferred method is molding under heat and pressure. Other methods which may be used include casting, injection molding, hand layup, sprayup, vacuum forming, and the like.

BRIEF DESCRIPTION OF THE DRAWINGS

The accompanying drawings illustrate the invention. In such drawings:

FIG. 16 is an isometric view of a second modified form of module with closed sides and bottom;

FIG. 16a is a sectional view of an end joint between modules as in FIG. 16;

FIG. 17 is an inverted isometric view of the module of FIG. 16;

FIG. 18 is a modified nozzle, alternative to that shown in FIGS. 9–11, in which the control orifice is molded in the module and receives the locking tongue of an insert forming the distribution apertures;

FIG. 19 is a bottom elevation of the structure shown in FIG. 18;

FIG. 20 is a sectional view of a further modified form of nozzle, mounted in a manner similar to that of FIGS. 18 and 19 but using a rectangular nozzle insert;

FIG. 21 is a nozzle pattern for use with nozzles of rectangular shape as shown in FIG. 20;

FIG. 22 is an isometric view of a rectangular nozzle insert with a modified means of attachment;

FIG. 23 is a section showing a further modified form of rectangular nozzle insert;

FIG. 24 is a fragmental isometric view showing a rectangular pattern of nozzles using a molded-in nozzle having a cross section like that of FIG. 15.

FIG. 25 is a section of a further modified form of molded-in nozzle which may be either of circular or rectangular cross section;

FIG. 26 is a plan view of the nozzle of FIG. 25, in circular configuration;

FIG. 27 is a section of a combined nozzle and leg, formed in molding the module, in which the nozzle is like that of FIGS. 25 and 26;

FIG. 28 is a section of the nozzle similar to that in FIGS. 26 and 27, but with a different control orifice;

FIG. 29 is a section taken on the line 29—29 of FIG. 28;

FIG. 30 is an isometric view of a further modified nozzle arrangement, in which the nozzles are formed in linear ribs along the top surface of the module;

FIG. 31 is an isometric view of the structural section of a modified module having a horizontal wall below the reinforcing ribs;

FIG. 32 is an isometric fragmental view of a top or cover for use with the structural section of FIG. 31; and FIG. 33 is a vertical section of an assembled module as shown in FIGS. 31 and 32.

DETAILED DESCRIPTION OF THE EMBODIMENTS SHOWN

Figure 1:
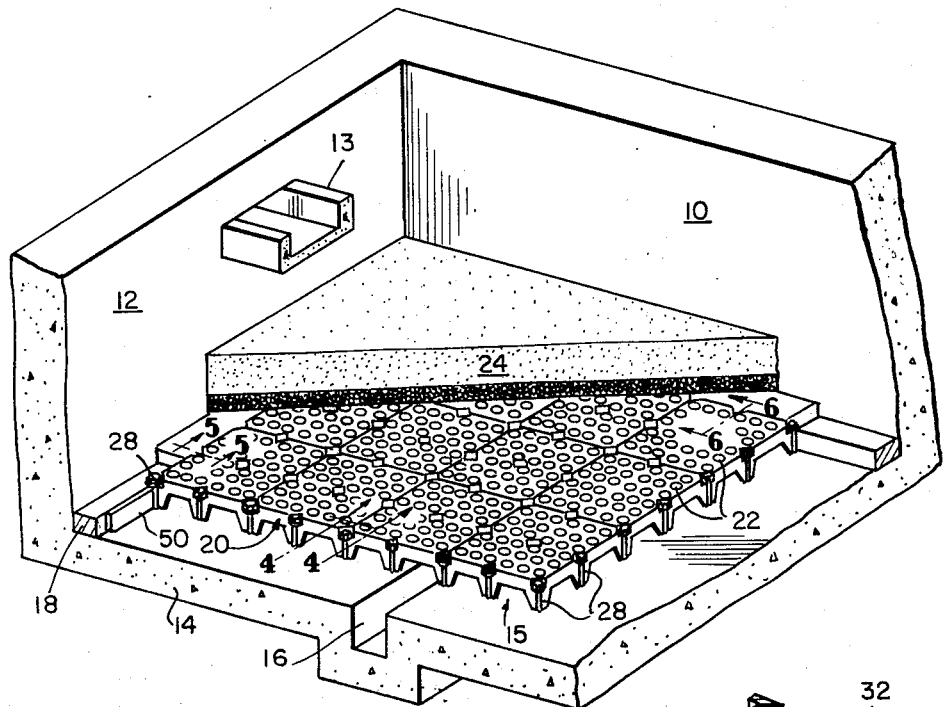
FIG. 1 is an isometric view of a filter made in accordance with the invention.

The filter shown in FIG. 1 comprises side walls 10, end walls 12 and a bottom wall 14. The end walls 12 support a flume 13 for supplying water to be filtered and for removing backwash water. The bottom wall 14 contains a water channel 16 through which filtered water is drained from the filter and backwash water is supplied under pressure. The bottom wall 14 is smooth and flat, but may slope slightly toward the water channel 16. A ledge 18 may be formed about the perimeter of the floor 14 as by laying preformed blocks for this purpose.

A filter bottom is formed in the filter tank by installing prefabricated modules 20 on the bottom 14, between the ledges 18. These rest on their own legs and form a false bottom spaced above the bottom wall 14 of the filter. They define a closed water collection and distribution chamber 15 over the entire area of the tank bottom 14. The modules are provided with a pattern of nozzles 22 through which filtered water may pass downward and backwash water may be forced upward. The filter bottom is covered with a filter bed 24 formed of a lower layer of gravel and one or more upper layers of smaller gravel or sand in conventional manner. In the filter shown in FIG. 1, the modules 20 are square in plan and may be 4-feet by 4-feet in size. They are fastened down to the bottom wall 14 by hold-down bolts 28 at their corners, at the mid-points of their sides, and at one center point, so that the hold-down bolts 28 are on 2-foot centers over the entire area of the filter bottom. The modules are sealed to each other and to the border ledges 18, so that substantially the only water passages are through the nozzles 22.

In filtering operations, raw water is introduced through the inlet trough or flume 13 and passes downward through the filter bed 24, then through the nozzles 22 to the chamber 15 between the filter bottom and the bottom wall 14 of the filter tank, from which it drains to the water channel 16. For backwash operations, water is forced under pressure through the water channel 16 to the distribution chamber 15 below the filter bottom formed by the modules, and the backwash water passes upward through the nozzles 22 and through the filter bed 24 to loosen and fluidize the bed and wash out accumulated mud and contaminants. The backwash water is discharged through the flume 13.

Figure 3:
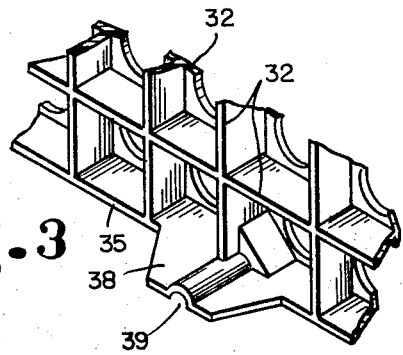
FIG. 3 is an isometric view showing the bottom ribbing of the module shown in FIG. 2.
Figure 2:
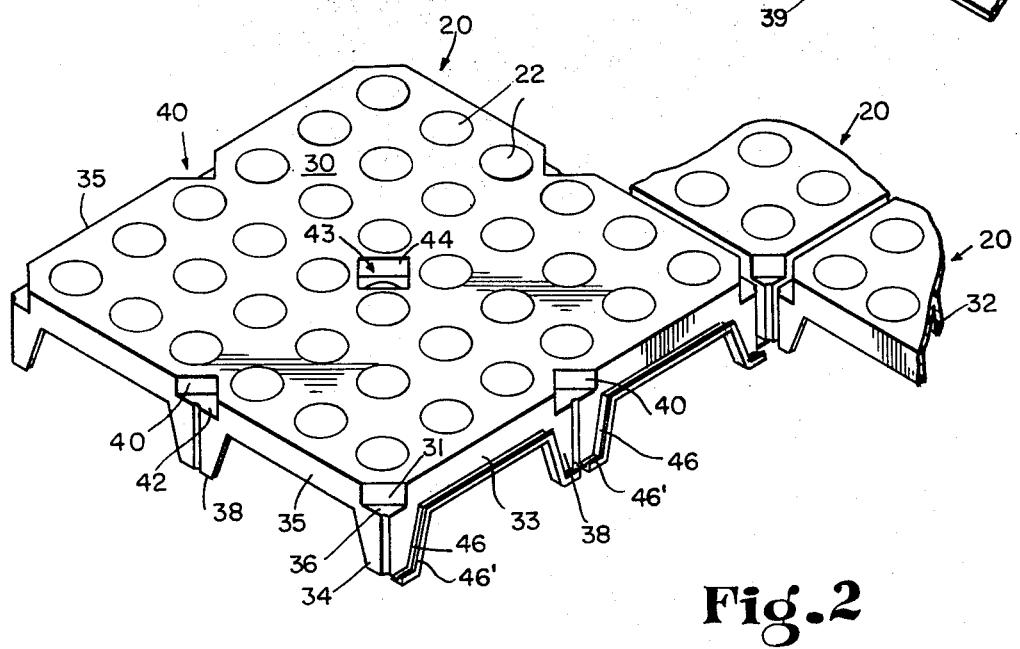
FIG. 2 is an isometric view of a module embodying the invention in a preferred form.

The preferred filter bottom module shown in FIGS. 2 and 3 is a unitary molding of high strength reinforced plastic, which comprises a structural plate which forms a floor section of the filter bottom, legs therefor, and at least part of the nozzle structure. It has a horizontal top wall 30 integrally reinforced with an underlying pattern or matrix of intersecting deep reinforcing ribs 32 extending between side walls 33 and 35. At each corner the module has a downward extending leg 34. A flat horizontal shoulder 36 is formed at the upper end of each leg 34, offset below the top wall 30, and at the bottom of an oblique corner wall 31, so that the wall 31 and shoulder 36 define one fourth of a square recess. The quarter-recesses at the meeting corners of four adjacent modules form a complete recess and a seat for a square hold-down washer 37 by which the modules are bolted down by bolts 28. Each leg 34 may have its corner cut back or have a groove formed in the corners, to provide bolt clearance. At the mid-point of each side, the module has a side leg 38, at the upper end of which the module is formed with a triangular half-recess 40 having a horizontal shoulder 42 at its bottom, for the reception of a square washer by which the module is bolted down at these points. The leg 38 may have a groove 39 formed in its outer face to give clearance for the anchor bolt 28.

An additional leg and hold-down is formed at the center of the module. A square recess 44 is molded in the top wall 30, with a flat shoulder at its bottom for the reception of a square washer 37, and a tubular leg extends downward from that shoulder to rest on the supporting surface of the tank bottom wall 14. See the cross section in FIG. 8.

Figure 4:
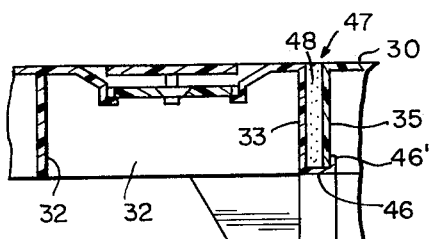
FIG. 4 is a sectional view taken on the line 4—4 of FIG. 1 showing an edge joint between adjacent modules.

The modules are formed to be sealed to each other and desirably to interlock. For this purpose, two adjoining sides 33 of the module 20 are provided with projecting ledges 46 having upstanding flanges 46' at their outer edges to form an upwardly open channel along the lower edge of each side wall 33 and along the edges of the corner legs 34 and center legs 38. Such ledges 46 are shaped and positioned to receive the plain lower edges of the side walls 35 and the legs at the other two adjoining sides of the module, and the edges of such sides 35 are shaped to fit in the channels formed by the ledges 46. As shown in FIG. 4 when the modules are placed together, with the side wall 35 of one module engaged in the channel 46 on the side wall 33 of the adjacent module, there is then formed a trough 47 between the modules, closed at the bottom by the ledge 46. Such troughs 47 are filled with grout 48 or other sealing compound to seal the two modules to each other along the entire joint between them. In this way, all the modules 20 of the filter bottom are joined and sealed to each other along the entire extent of their adjoining edges. The wide ledges also permit adjustment of the spacing and fit between the modules.

Figure 5:
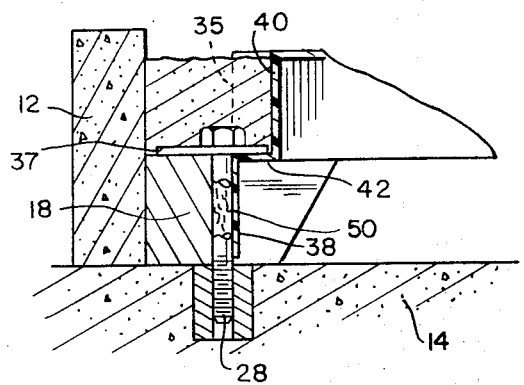
FIG. 5 is a sectional view showing a form of edge joint which may be used between the end wall of the filter tank and an adjacent module, taken on the line 5—5 of FIG. 1.

At the perimeter of the filter bottom, the pattern of modules 20 is sealed to the ledges 18. The joint between the ledge 18 and the module sides 35 which have no projecting channels may be as shown in FIG. 5. The tank ledge 18 is desirably of the same height as the hold-down shoulders 36 and 42 so that a washer 37 may be rested half on the ledge 18 and half on such a shoulder, and bolted down by a bolt 28 disposed in a clearance space between the side face of the tank ledge 18 and the side wall 35 of the adjacent module 20. Between the bolts 28, filler strips 50 may be placed in the clearance space, and the trough which is formed above the ledge 18 between the tank wall 12 and the module side edge 35 is filled with grout 48 or other sealing compound.

Figure 6:
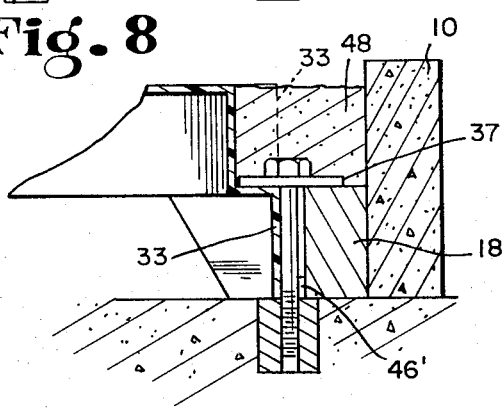
FIG. 6 is a sectional view showing a form of joint which may be used between a side wall and a different edge of a module, taken on the line 6—6 of FIG. 1.

A similar joint is formed between the sides 33 of the modules 20 and the ledge 18 at the base of the side wall 10 of the filter tank, as shown in FIG. 6. In this case, the module ledge 46 may be placed with its outer flange 46' abutting against the face of the tank ledge 18 so that such ledge 46 closes the bottom of the clearance space between that face and the module side 33 and its legs 34 and 38. Accordingly, no filler strip 50 need be used, and the entire clearance space and the channel overlying the ledge 18 may be filled with grout 48.

Figure 7:
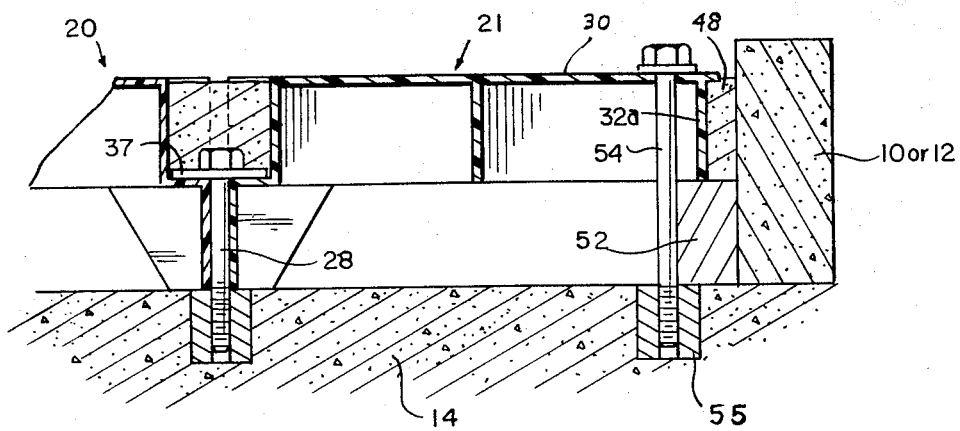
FIG. 7 is a sectional view showing the use of a part of a module to fill in an incomplete space at an edge of the filter bottom.

If the distance between the opposite walls of the filter tank is not a multiple of whole modules 20, modules can be cut and mounted as shown in FIG. 7. Here, a module has been cut adjacent a rib 32a to provide a section 21 wide enough to substantially fill the space between a whole module 20 and the adjacent wall 10 or 12. A filler block 52 is laid adjacent the inner face of the wall high enough to support the bottom of the rib 32a. The free edge of the module section 21 can be fastened down by means of long bolts 54 inserted through drilled holes in the top wall 30 of the module section 21 and threaded into anchors 55 set in the bottom tank wall 14. The rib 32a will engage the filler block 52 over its entire length and substantially close the trough formed between that rib 32a and the adjacent tank wall 10 or 12, and such trough is filled with grout 48 to seal the edge of the filter bottom to that wall.

Figure 8:
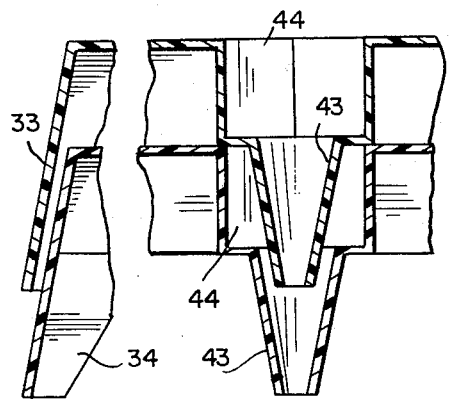
FIG. 8 is a sectional view showing a preferred modification in which the modules may be stacked for shipping.

Modules 20 are desirably formed so as to nest in stacked relation for shipment and storage. To this end, as shown in FIG. 8, the side walls 33 and 35 and their connected legs 34 and 38 are formed to diverge downward, so that their lower ends will freely straddle the upper portion of an underlying module in a stack. Also, the central recess 44 of each module is formed as a parallel sided rectangular cavity down to the bottom of the recess, and the depending hollow leg 43 below that recess 44 is of inverted conical shape, so that the lower end of each such leg will freely nest in the leg of the underlying module 20.

Each module 20 contains a pattern of nozzles 22 in its top wall 30 to provide a uniform distribution of such nozzles over the entire filter bottom. Preferably, such nozzles are formed without upstanding projections above the flat upper surface of the module, so that planks may be laid across the modules during installation to permit workmen to move about on the already-laid modules.

Figure 9:
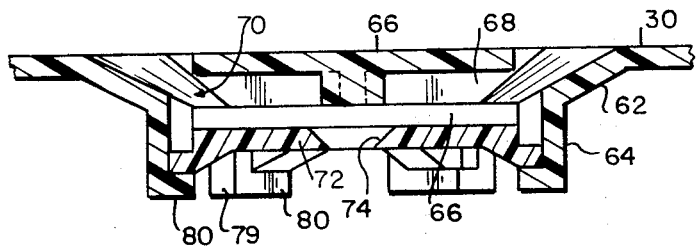
FIG. 9 is a vertical section of a preferred form of module nozzle.
Figure 10:
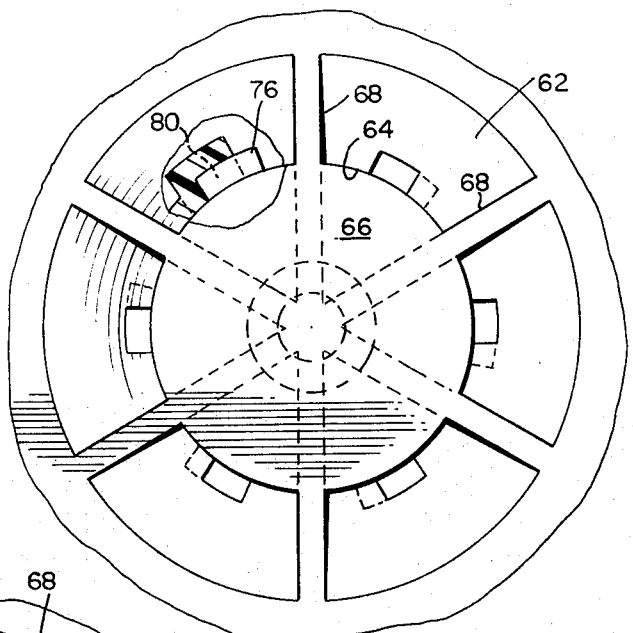
FIG. 10 is a plan view of the nozzle shown in FIG. 9.
Figure 11:
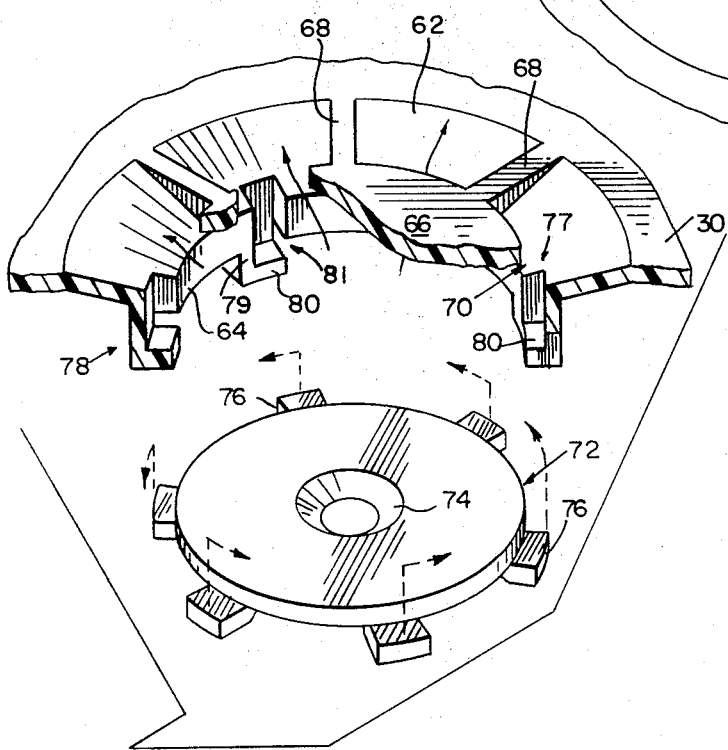
FIG. 11 is an exploded isometric view of the nozzle of FIGS. 9 and 10.

A preferred form of nozzles is shown in FIGS. 9–11. The upper wall 30 of the module is formed with a circular nozzle border ring 62 which slopes inwardly downward and is joined at its lower end to a depending collar 64 of circular shape. Above the opening in the collar 64 and coplanar with the top wall 30 there is a central plate 66, supported from the surrounding structure by a plurality of integral radial ribs 68, conveniently six in number. The periphery of the plate 66 is spaced from the collar 64 to provide apertures 70 circumferentially between the ribs 68 and directed outward toward the sloping conical ring 62. Such apertures 70 form openings to pass filtered liquid inward and downward. They also form the nozzle distribution apertures which discharge backwash water laterally with a small upward inclination along the surface of the conical ring 62, so that the backwash water is discharged into the overlying gravel in large volume at relatively low velocity and in lateral directions about the entire periphery of each nozzle. It thus has little upward velocity which would tend to produce channeling and localized disturbance in the overlying filter bed.

Beneath the plate 66, the opening through the collar 64 is closed by an insert 72 which contains a central control orifice 74 of a size calibrated to freely pass downward-flowing filtered water but to restrict and throttle and thereby control the flow of backwash water from the underlying distribution chamber 15 to the distribution apertures 70. The insert 72 is a circular disk with a plurality of lugs 76 projecting from its periphery, preferably at a level below the upper surface of the insert. These lugs 76 lock into keepers 78 formed at spaced points about the lower edge of the collar 64. The keepers 78 have a vertical wall 79 depending from the collar 64, and have a horizontal wall 80 extending circumferentially from the vertical wall 79 in spaced relation below the bottom edge of the collar 64, to form a side opening 81. The insert 72 can therefore be fitted into the collar 64 with its lugs 76 beside the openings 81 of the keepers 78, and then rotated in a direction to carry its lugs 76 into overlapping relation with the keeper walls 80, to lock the insert 72 in place.

The preferred nozzle is such that, except for the insert 72, it can all be formed in the molding of the module, and can be molded between a single pair of upper and lower dies. Thus, the upper surface of the plate 66, its supporting ribs 68, and the top face of the border ring 62 can be formed by the upper die, while the lower surfaces of those parts can be formed by the lower die. To form the keepers 78 between the same two dies, the collar 64 is provided with vertical recesses 77 immediately above the keeper walls 80, so that the keepers 78 can be formed between projections on the upper die and cavities in the lower die. Each such projection is disposed in contact with a side wall of its complementary cavity so as to form the side opening 81 for admitting the lugs 76 to locked position. The lugs 76 are wider than the length of the wall 80 of the keeper 78, and of such thickness that they close the openings 81 when the insert 72 is in place.

With nozzles 22 as described, arranged in a pattern of six by six on a module 20 as shown in FIG. 2, the ribs 32 on the underside of the top wall 30 are arranged in a rectangular pattern to form a box or cell below each nozzle. The ribs 32 reinforce the upper wall 30 and provide a strong structure bridging the legs 34, 38, and 43 to provide adequate plate strength to sustain the weight of the overlying filter bed. Additionally, with the modules fastened down to the bottom wall 14 of the filter tank, the modules form a filter bottom of sufficient strength to withstand elevated pressure in the incoming backwash water, as is necessary to secure equalized flow of such water through the several nozzles over the entire area of the bed.

Operation of the filter of FIGS. 1-11 is as follows. Durring filtering operation, raw water is introduced through the flume 13 to fill the tank to a level above the filter bed, and such water filters downward through the sand and gravel of the filter bed. The nozzles 22 provide widely distributed openings at the bottom of the filter which permit free escape of the water from the gravel bed through the filter bottom to the underlying collection chamber 15 and thence to the water channel 16 through which the filtered water is withdrawn. In backwash operation, water is forced under pressure in large volume to the water channel 16, to fill the distribution chamber 15 below the filter bottom. Since the modules 20 are sealed to each other and to the ledges 18 about the periphery of the filter bottom, the backwash water is forced upward through the restricted control orifices 74 of the several nozzles. Such orifices restrict the flow so as to create back pressure below the filter bottom which is substantially equal at all the nozzles, and such equal pressure produces substantially equal flow through all the nozzles 22. Since such nozzles are all of substantially uniform capacity, this produces a uniform distribution of backwash flow over the entire area of the filter bottom. The pressure and the restriction at the control orifices 74 produces high velocity flow through those orifices, but the high velocity is deflected and diffused in the passages between the nozzle plate 66 and the underlying insert 72, and discharge flow outward through the distribution apertures 70 of the nozzle is at a substantially lower velocity. Moreover, such discharge flow is directed outward with little upward inclination so that it is distributed through the gravel and produces a minimum of disturbance to the overlying filter bed. This permits a large volume of backwash flow at a high flow rate through the filter bed, in such even distribution throughout the filter bed that the filter bed is uniformly backwashed without channeling or the formation of blowholes.

Figure 12:
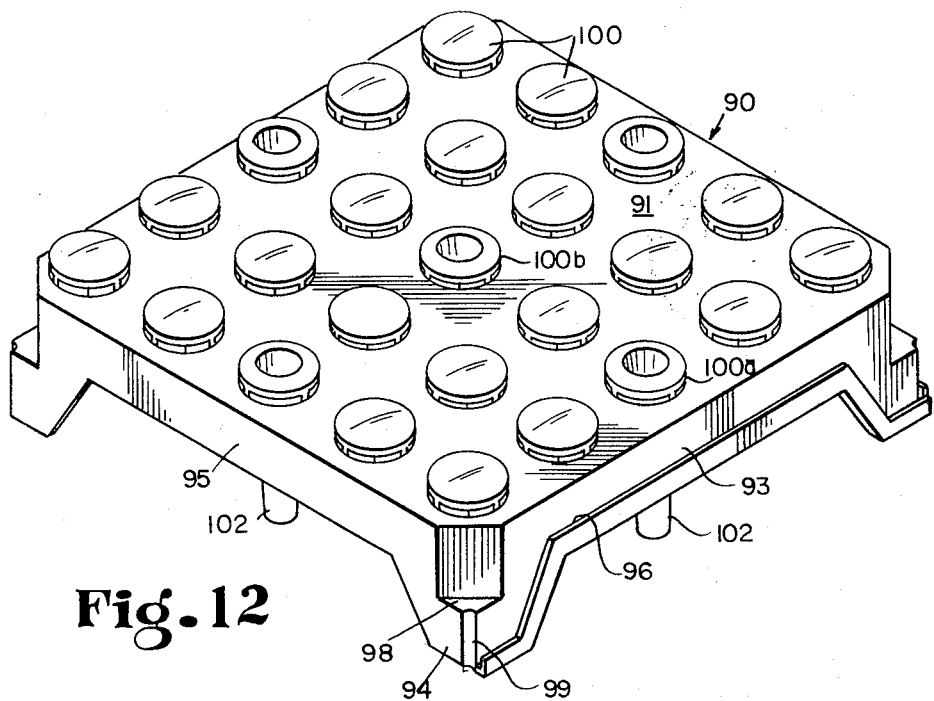
FIG. 12 is an isometric view of a modified and smaller size module having a modified edge and a leg construction.
Figure 14:
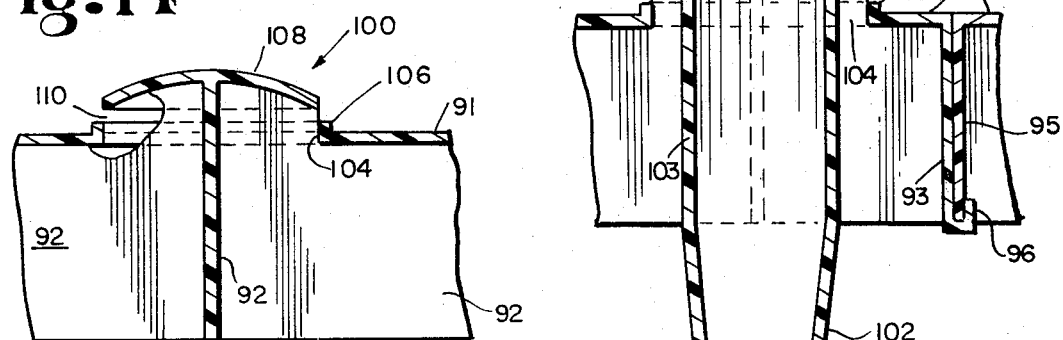
FIG. 14 is a vertical sectional view of a similar nozzle not including a leg.
Figure 13:
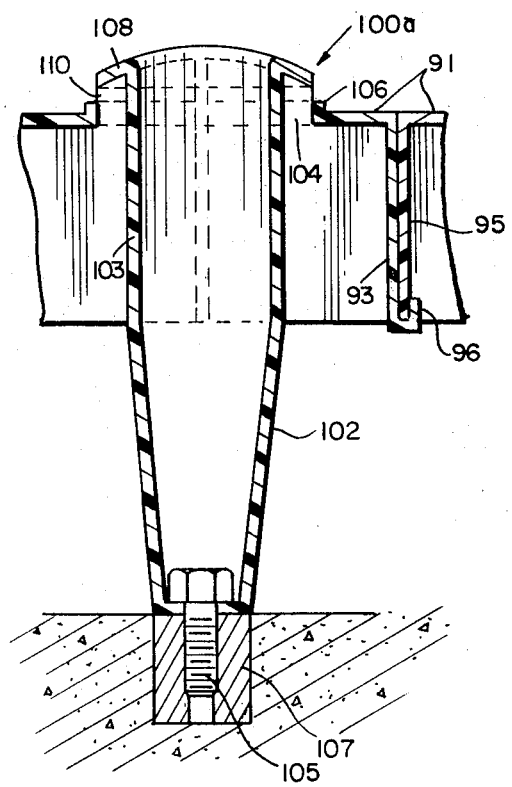
FIG. 13 is a sectional view showing the modified edge joint of the module of FIG. 12 and a combined leg and nozzle.

The modified filter bottom module 90 shown in FIGS. 12-14 is similar to that described above, in that it comprises an upper wall 91 reinforced on the underside with a rectangular pattern of ribs 92, and provided with corner legs 94. This module is of smaller size than that of FIG. 2, say 30 inches by 30 inches, and is provided with nozzles 100 located at the intersections of the ribs 92 in a five by five pattern. Two adjoining side walls 93 are formed with upward open narrow channels 96 at their lower edges, and the two other side walls 95 have free lower edges adapted to be received in the channels 96 to lock adjoining modules together. In this instance, the channels 96 are of narrow width, as shown in FIG. 13, to closely confine the edges of the side walls 95 and to provide no space for the reception of sealing grout. Instead, the walls may be sealed by sealing compound deposited in the channels 96 before the walls 95 are engaged therein.

The module 90 has no legs at the middle of its side walls. The nozzle 100a at the middle of the row along each side of the module may be formed to provide a leg 102, as shown in FIG. 13. Also, the center nozzle 100b may be similarly formed to provide a leg 102. In each case, the legs may provide for bolting the module to the tank bottom.

As shown in FIGS. 13 and 14, the nozzles 100 and legs 102 are wholly formed in the molding of the module 90. The upper wall 91, at the intersection of two ribs 92, is formed with a circular opening 104, surrounded by a short upstanding rim 106. Above the opening 104 there is a plate 108, whose peripheral edge is spaced upward from the rim 106 to define distribution apertures 110. The plate 108 is supported on and integral with upward extensions of the intersecting ribs 92. With rectangular ribs 92, such upward extensions subdivide the distribution apertures 110 at four points spaced 90° apart.

The nozzles 100 shown in FIG. 14 can be made in the two part mold which forms the module 90, by providing the lower die with projections to form the lower face of the plate 108 and the rib extensions, and providing the upper die with a conforming cavity, the sides of which are in substantial contact with the side faces of the projections at the areas where the distribution apertures 110 are to be formed.

The nozzle 100a shown in FIG. 13 is similar to that of FIG. 14 except that a tube 103 is formed down through the center of the nozzle, and this is connected at its lower end to a conical leg 102 which is closed at the bottom except for a hole to pass a bolt 105 to connect the leg to an anchor 107 inserted in the bottom wall 14 of the filter tank. The tube 103 is open at the top through the plate 108 of the nozzle, which permits the tube 103 and leg 102 to be formed between a projecting core on the upper mold die and a cavity in the lower mold die.

The corner legs 94 of the module 90 are similar to those of the module 20. They are provided with hold-down shoulders 98 offset downward from the upper wall 90, to be engaged by a washer under the head of a hold-down bolt. Since with narrow channels 96, the sides of adjoining modules are in close side-to-side relation, the corners of the legs 94 are formed with quarter round grooves 99 to pass the hold-down bolts.

Figure 15:
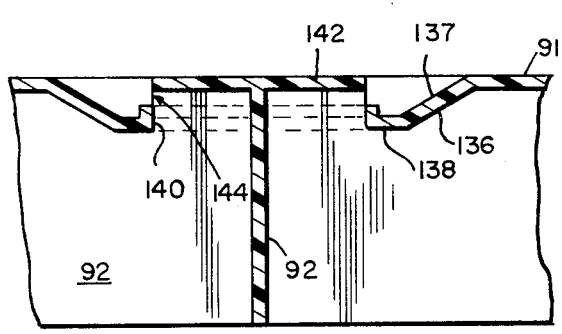
FIG. 15 is a section of a similar nozzle having a flat top.

The nozzle 100 of FIGS. 12-14 may be modified as shown in FIG. 15 to eliminate the upstanding projection and provide a flat top surface for the module. In such modification, the top wall 91 is molded with depressed border 136 at the periphery of the nozzle, which has an outer inwardly downward sloping portion 137 joined at its lower end to a horizontal collar 138 which carries an upstanding rim 140. A nozzle plate 142, coplanar with the wall 91, is spaced above the rim 140 to define therebetween a distribution aperture 144. The plate 142 is integral with the intersecting ribs 92, which subdivide the distribution aperture 144 at four spaced points. The nozzle shown in FIG. 15 may be circular in plan, corresponding to the circular nozzles described above, or may be square or rectangular in plan as shown in FIG. 24.

Operation of a filter bottom made from modules as shown in FIGS. 12-15 is in general the same as that of FIGS. 1-11. The modules are installed on the bottom of the filter tank, bolted down, sealed to each other and to the tank walls, and covered with a filter bed. The nozzle apertures 110 or 144 form drain openings for filtered water. For backwashing, backwash water is forced under pressure through the nozzle apertures. Since there are no separate control orifices, the distribution apertures 110 or 144 serve both to equalize flow through all the nozzles over the entire filter bottom and to distribute and direct that flow in a manner to produce effective backwashing without channeling. The nozzles discharge in all directions about their peripheries, and all the water is directed laterally with little or no upward component of flow. With such well-directed discharge, the backwash pressure below the filter bottom can be adequate to equalize pressure at all nozzles, without producing such high velocity upward flow as to cause channeling or otherwise damage the filter bed.

A further modified filter bottom module of elongated conduit shape is shown in FIGS. 16 and 17. Here, the module 148 is formed of an inverted channel-shaped top section and a bottom pan. The top section comprises plate 150 reinforced on its underside by a rectangular pattern of ribs 152. The module 148 is of elongated shape, for example 24 inches wide by 48 inches or more long. At its long sides, it is provided with side walls 154 which extend straight downward through an upper portion 153 and thence inward and downward through an inward offset portion 155, to form supporting legs. The lower edges of the wall sections 155 are received in grooves at the side edges of a pan 156, formed between spaced flanges 157 and 158. The inward offset of the lower portions 155 of the side walls is sufficient to permit the outer faces of the outer flanges 158 to be coplanar with the outer faces of the upper portions of the side walls 154.

Desirably, the channel-shaped top section is preassembled with the pan and the lower edges of the side wall portions 153 are secured in the grooves of the pan, as with epoxy or other adhesive. The modules are then self-contained, with their own bottoms to form conduit sections providing open water passages below the nozzles which are formed in the top plate 150.

The ends of the modules 148 are arranged to be sealed to adjoining modules as shown in FIGS. 16a and 17. Thus, in FIG. 17, the front end of the module is formed with a projecting collar flange 160 at the base of the end wall 151 of the plate section 150 and at the side wall portions 153; and the pan 156 carries a collar flange 162. As shown in FIG. 16a, when two modules 148 are assembled end-to-end, the collar 160-162 on the module 148a fits into the open end of the adjoining module 148b to form a substantially tight joint between the two modules.

In use, the modules 148 are laid end-to-end and side-by-side on the bottom wall 14 of a filter tank, in a direction to extend transversely across a water channel 16. At the walls of the filter tank the ends of each line of modules are closed by end plates (not shown) and sealed to the tank walls. To provide communication between the channel 16 and the interior of each line of conduit modules 148, bottom openings 164 are cut in the pan 156 of the module which overlies the water channel 16.

Each line of end-to-end modules 148 will form a substantially closed conduit in which the modules are interlocked with each other and sealed at their ends, and in open communication with the water channel 16. In many cases the modules will be held down adequately by the filter bed and no hold-down bolts will be necessary. When positive hold-down means is considered desirable, the pre-assembled modules 148 may be cemented to the bottom wall 14 of the tank, as with epoxy or other adhesive.

The upper wall 150 of each module 148 is provided with a pattern of nozzles 168, which may be of any of the forms disclosed herein. As shown in FIGS. 16 and 17, the nozzles 168 are located between the ribs 152 on the top wall, in the boxes formed by the rectangular matrix of intersecting ribs, in the same way as in FIGS. 2 and 3. The nozzles may therefore be as shown in FIGS. 9-11 or in FIGS. 18—19. Alternatively, the nozzles may be located at the intersections of the ribs 152, in which case the nozzles may be as shown in FIGS. 13-15.

The nozzles represented in FIG. 16 are more fully shown in FIGS. 18 and 19. These are also adapted for use in the module of FIG. 2. In such nozzles, the upper module wall 170 of the module is formed with circular depressions 172 each having an inwardly downward sloping peripheral wall 174 joined to a central wall 176. The central wall 176 contains a key hole 178 having a central circular portion and opposite side branches 180. At right angles to the side branches 180, the bottom surface of the wall 176 carries a pair of stop lugs 182. For cooperation with this structure, the nozzle comprises an insert 184 having a peripheral wall molded to form a peripheral series of distribution openings 186 which, for convenience of molding, extend from the top surface of the insert 184 downward a distance less than the full height of the insert, to leave an integral ring 187 at the bottom of the insert. The ring 187 may be provided with a circumferential series of notches 188 to form supplemental distribution openings. The center of the insert 184 may be formed with a central depression 185, from which a key 190 extends downward. The key 190 is formed to pass freely through the extensions 180 of the key hole 178, and is slotted at its edges to provide a T-head 191. When the key 190 is inserted in the hole 178 and rotated through 90°, the ends of the T-head 191 move out of alignment with the key hole extensions and under the wall 176 and against the stops 182. The insert 184 is then locked in place in the depression 172. The cavity 185 in the top of the insert 184 may be shaped to form a hexagonal or other non-circular socket for the reception of a tool for turning the receptacle 184 to locked position.

In the nozzle of FIGS. 9-11 the distribution apertures 70 were formed in the molding of the module, and the throttle orifice 74 was formed by the insert 72. In the modified nozzle of FIGS. 18–19, the original molding of the module top wall 170 forms the key hole 178 which also serves as the throttle orifice, and the distribution apertures 186 are formed in the attached insert 184.

A box type nozzle is shown in FIG. 20. Here, the flat top module wall 196 is flat and is formed with a key hole 198 of the same shape as the key hole 178 in FIG. 19, and with stop lugs 199 on its under surface. The attachment or insert 200 is in the form of an inverted box having an imperforate top wall 202 and side walls which contain vertical slots 204 about the entire periphery of the insert. At the center of the insert a pair of depending crossed webs 206 and 207 extend downward from the top wall 202, and the web 206 is provided at the bottom with a T-head 208 adapted to be inserted through the key hole slot 198 and rotated to lock the insert in place. The slots 209 which separate the T-head 208 from the body of the web 206 may be formed as saw kerfs after the part has been molded.

With this nozzle of FIG. 20 the throttle orifice is formed by the key hole 198, and the distribution apertures are formed by the slots 204 in the side walls of the insert 200. The insert can be made of any desired height, to obtain diffusion apertures of a desired total area. By increasing the area of such distribution apertures 204, the velocity of discharge of backwash water into the filter bed can be reduced while providing substantial volume of backwash water. Also, the location of the distribution apertures 204 in the side walls of the box-like insert 200 provides that the backwash water will be distributed laterally and with little or no vertical component of velocity.

The lateral distribution of backwash water from the side apertures 204 may be utilized to obtain a good distribution of the backwash water over the entire area of the filter bottom by placing the rectangular nozzle units 200 in a pattern as shown in FIG. 21. The pattern contains parallel rows of nozzle units 200a, b, c, etc., with the units of each row spaced from each other and located opposite the spaces of the adjacent rows. This produces a discharge pattern in which the units of each row, for example, the units 200b, discharge from their end apertures into the spaces 210 between the units in the row. In the adjacent rows, the units 200a and 200c discharge through their side distribution apertures toward that same spaces 210, across the spaces 212 between the rows. Substantially the entire area of the filter bottom is supplied with laterally directed backwash water, and such supply may be at high volumetric rates but at low velocity, with little or no vertical component of velocity. This provides good distribution of backwash water with little or no tendency to produce channeling or blowholes in the filter bed.

An alternative box-type nozzle is shown in FIG. 22. This comprises a nozzle unit 214 in the shape of an inverted rectangular box, with distribution apertures 216 in its sides and ends, and with an outward flange 218 about its bottom periphery. The unit 214 is mounted on the top wall 220 of a module, and such wall is provided at each nozzle location with a central control orifice 222 and with two or more keeper blocks 224 formed to provide laterally open notches 226 for the reception of the corners of the flange 218. At the opposite corners of the seated position of the unit 214, the top wall 220 is formed with short ribs 228 located to block lateral release movement of the flange 218 from engagement with the keepers 224. The nozzle unit 214 is installed by placing it against the face of the top wall 220 and rotating it to carry its opposite corners into locked engagement with the keepers 224 and ribs 228. It is then centered over the throttle orifice 222, to receive backwash water therefrom and to discharge such water through its distribution apertures 216.

FIG. 23 shows a modified box-type nozzle. For this, the module top wall 230 is provided at each nozzle location with a threaded insert 232 and with two control orifices 233. The nozzle unit or insert 234 is formed with a central hollow post 236 which extends into abutting relation with the face of the wall 230 about such insert 232 and provides for the insertion of a screw 237 to secure the unit 234 in place. The unit 234 has distribution apertures 238 formed in its side and end walls, which extend through the top wall and downward to a continuous bottom rim 240. In order to locate the nozzle unit 234 on the wall 230 and prevent its rotation, the rim 240 is desirably provided with one or more downward projections or locating pins 242 which take into matching cavities formed in the module top wall 230. In use, the orifices 233 admit backwash water into the interior of the nozzle unit 234 for distribution through its distribution apertures 238.

A rectangular pattern of nozzles similar to that shown in FIG. 21 may also be used with nozzles other than the box type nozzles of FIGS. 20, 22, 23. As shown in FIG. 24, the module top wall 243 is provided with a rectangular pattern of molded-in nozzles having a cross section like that of FIG. 15. Each nozzle has a peripheral portion defined by an inwardly downward sloping portion 244, the lower edge of which is spaced below the edges of a plate 245 coplanar with the module wall, and the space between the adjacent edges defines distribution apertures 246. A plurality of ribs 247 distributed about the periphery of the nozzle supports the central plate 245 from the module wall. As indicated by the arrows, backwash flow is discharged both longitudinally between the nozzles of each row, and laterally across the spaces between the rows. In this case the direction of discharge flow has a small upward component of direction, but the major component is lateral so that the backwash water has little vertical velocity and does not tend to produce channeling and blowholes.

The further modified nozzle shown in FIGS. 25 and 26 is completely molded in one piece with the module wall 250 and provides both control orifices and distribution apertures. As shown, each nozzle is circular in plan and comprises a side wall 252 closed at the top by top wall 254 and surrounded by a plurality of spaced radial ribs 256 which define intervening slots 258 which form distribution apertures. At the inner bottom of each slot 258, adjacent the wall 252, an opening 260 is formed through the wall 250 to provide a control orifice for the slot with which it communicates. The outer edges of the ribs 256 may be sloped to converge upward and to lie substantially on the surface of a cone coaxial with the cylindrical wall 252. The outlet area of each slot 258 at the outer edges of the ribs 256 is many times greater than the inlet area of the control orifice 260 leading to the slot, as by a ratio of the order of 16:1. Accordingly, the orifices 260 act as control orifices which supply the slots 258 with backwash water under considerable pressure and velocity, and those slots 258 serve as diffusion passages from which the water is discharged at their outer openings at low velocity. By adjusting the widths of the slots, and the size of the control orifices 260, the discharge velocity can be sufficiently low to avoid channeling and blowholes in the filter bed.

The nozzles of FIG. 25 and 26 may be used either in locations between reinforcing ribs, as in FIGS. 9-11, or at the intersections of ribs as in FIGS. 13-15. They may also be modified to provide supporting legs for the module, as shown in FIG. 27. Here, the cylindrical wall 252 of the nozzle is integrally joined at its bottom end to a tapered leg 262, closed at its bottom by a wall provided with a bolt hole 265. To permit molding in a two-part die, the top wall 254 of the nozzle in FIG. 25 is omitted. The control orifices 260 and the slots 258 forming diffusion passages and distribution apertures are the same as in FIG. 25. The leg 262 may be integrally joined to intersecting ribs 251 which may have downward extensions 253 to brace the lower end of the leg 262.

The modified cylindrical nozzle shown in FIG. 28 and 29 is similar to that shown in FIG. 25 and 26 but has a different orifice. It is molded integrally with the module top wall 270, and comprises a cylindrical wall 272 closed at the top by a wall 274. The cylindrical wall 272 extends downward through and past the plane of the module top wall 270, and below such wall is surrounded by a collar 276. The cylindrical wall 272 and the collar 276 are spaced apart by a circumferentially continuous cylindrical slot 278, and such slot extends continuously upward beyond the collar 276 to a level near the top of the nozzle structure. A circumferential series of radial bars or ribs 280 is formed about the cylindrical wall 272, spaced outward from such wall by the width of the cylindrical slot 278, and standing between the module wall 270 and the top end of the nozzle. These ribs define between them a series of slots 282 which are open at their inner ends to the cylindrical slot 278, from which they receive backwash water. The cylindrical slot 278 over its length within the height of the collar 276 serves as a common control orifice for liquid flowing to the slots 282, such slots serve as diffusion passages, and their outer ends provide distribution apertures for discharging the backwash water from the nozzle into the surrounding filter bed. For molding purposes, the slots 282 desirably have their side faces in upwardly diverging or parallel relation. Horizontally, the side walls of the slots may be parallel or diverging or converging as may be desired to provide desired diffusion of the backwash water supplied under pressure and upward velocity through the control orifices 278 and to cause it to be discharged laterally at low pressure from the outer edges of the slots 282.

In the modification of FIG. 30, the module top wall 290 is formed with a plurality of spaced wide ribs 292 which may extend continuously from edge to edge of the module. At spaced points along their length, the ribs are formed with downwardly open blind cavities 294 of restricted cross section, which may be molded by upstanding projections on the lower die. After the ribs 292 have been molded with such cavities 294, the sides of the ribs are sawed to form saw kerfs 296 along their entire lengths, which intersect the cavities 294. The original blind cavities 294 then communicate with the inner edges of the saw kerfs 296, and provide a series of control orifices leading to the inner edges of such kerfs. The kerfs 296, on the other hand, form diffusion passages leading from such control orifices, and the outer open edges of the kerfs form distribution apertures for distributing backwash water to the overlying filter bed.

Desirably, the ribs 292 are offset upward from the plane of the module wall 290, as by molding a groove 298 below the base of the ribs 292. This facilitates sawing to form the kerfs 296, and has the desirable effect of positioning those kerfs upward from the face of the module wall 290 and to form shoulders 299 which serve as dams to allow sand from the filter bed to collect on the face of the module wall 290 without being washed into the kerfs 296 and orifices 294.

Several forms of nozzles have been disclosed. In some, as in FIGS. 9-11, distribution apertures are molded in as part of the molding of the module, and an insert or attachment is added to each nozzle structure to provide a control orifice for the nozzle. In others, as in FIGS. 18-23, a control orifice is formed at each nozzle location as the module is molded, and inserts or attachments are added to provide a diffusion chamber or passage and distribution apertures. In still others, as in FIGS. 25-29, the control orifices, the diffusion passages, and distribution apertures are all formed in the molding of the module. Nozzles with both control orifices and distribution apertures are generally preferable, but for some applications it is feasible to use nozzles in which a single set of openings provide both the control function and the distribution function. In such cases, the necessary openings can be molded in as the module is molded, as illustrated in the nozzles of FIGS. 13-15 and 24.

By making filter bottoms of molded modules in accordance with the present invention, it is readily feasible to fully prefabricate the modules, complete with structural walls and supporting legs, and with finished nozzles at each nozzle location, before delivering the modules to the installation site. The modules can then be set in place at the installation site without requiring placement of nozzle parts as part of the installation procedure. The filter tank which receives the prefabricated modules is easily formed. Its bottom may be flat and smooth, but may have a slight slope sufficient for drainage to water channels formed therein. The modules are laid in place and fastened down, and can be in large sizes to expedite the work. The joints between the modules and between them and the side walls of the tank are sealed, as by depositing grout in the closed-bottom channels formed between the interlocking sides of the modules, as shown in FIG. 4. The modules are of light-weight construction, so that relatively large modules can be installed manually, which reduces time and expense of installation. The light weight modules can be made to stack to conserve space in shipping.

The modules may be molded from any of a variety of plastic materials and by any of a number of molding procedures, in accordance with practices known in the art. By way of example, a desirable thermosetting compound for molding the modules disclosed has the following formula, in which proportions are by weight:

| | |
|---|---|
| Catalyzed corrosion-resistant bisphenol A fumeric acid polyester resin | 30% |
| Glass fiber | 30% |
| Inorganic filler (calcium carbonate) | 40% |

A compound of this character is desirably mixed and formed into mold slugs or charges, and is desirably molded by compression molding.

Instead of the resin of the above formula, various other thermosetting resins may be used. For high strength material, thermosetting resin may be used in proportions from 25 to 40 percent of the total composition. Reinforcing fibers are desirably included, such as glass, asbestos, or organic fibers, and the fibers may be present in proportions of from zero percent to 50 percent.

Thermoplastic resins may also be used, in which case, the resin proportions may be from 60 to 100 percent, with the balance made up of fillers, including reinforcing fiber fillers.

Mixtures of thermosetting and thermoplastic resins may also be used. The resin compositions may contain catalysts and other processing aids and controls, in accordance with known molding practice. Different methods of forming may be used to suit different compositions, availability of equipment or preferences, and such other methods would include casting, injection molding, hand layup, spray coating of molds, etc.

A further modified form of module shown in FIGS. 31-33 comprises a base section 300 and a cover section 302. The base section is molded with a horizontal plate structure formed of side walls 304 and 306 joined by a network of intersecting ribs 308 with a horizontal wall 310 at the bottom of the ribs and side walls. The base section 300 has legs 312 at each corner, and a center leg 314, which may be like those shown in FIGS. 2 and 3.

The ribs 308 and bottom wall 310 form a plurality of cells or boxes closed at the bottom by the bottom wall 310 and open at the top. The bottom wall contains a central opening 316 to form an orifice for a nozzle at each cell. The cover plate 302 closes the open upper ends of the cells and provides nozzle distribution apertures 318 at the top of each cell. Conveniently, these are similar to the apertures shown in FIGS. 9–11. Thus, at each cell the cover is formed with an inwardly downward sloping peripheral wall 320 having a large central opening at the bottom, and a plate 322 is formed above such opening and spaced from the peripheral wall 320 to define a ring of apertures 318 at its edges. The plate 322 is joined to the cover by a pair of crossed ribs 324.

The cover 302 is formed with internal ribs 326 to fit over the ribs 308 and close off the several diffusion cells from each other. The cover plate 302 desirably has side skirts 328 adapted to telescope over the side walls 304 and 306 of the base structure 300, and the corners of the cover 302 may be formed with downward offset shoulders 330 to overlie the shoulders 313 at the top of the legs 312.

The modules of FIGS. 31-33 may be arranged for sealing to adjacent modules in a manner similar to that of FIGS. 2 and 4. As shown, the base structure 300 is provided at its side walls 304 with projecting channel ledges 332 adapted to engage under the lower edges of the side walls 306 of adjoining modules. This forms grooves between the adjacent modules which are filled with grout or other sealing compound.

The present invention provides filter bottom modules which may be molded and prefabricated as self contained units, which are of light weight and relatively large size, so that they can be installed with a minimum of labor and equipment. They provide convenient means for securing the filter bottom to the filter tank to withstand the elevated pressure of backwash water and to distribute that backwash water over the whole area of the filter. They provide for convenient sealing of the modules to each other, so that filtering and backwash flow is confined to the specially designed nozzles. They permit the filter bottom to have a flat top surface to permit planks to be laid over a partially completed bottom for convenience in construction.

The molded modules provide a convenient and efficient means of providing nozzles of predetermined design and with any of a variety of water flow characteristics as desired, and which are independent of the skill or care exercised by the workmen who install the filter bottom. They permit the nozzles to provide for discharge of backwash water in high volume at relatively low velocity in horizontal directions with little upward component of flow to minimize the danger of channeling and formation of blowholes in the filter bed.

The modules are readily formed of molding compound which provides high corrosion resistance to the water being filtered and to acid and other chemicals which may be used in the backwash water to clean the filter. The modules may be formed with advantageous mechanical features to facilitate stacking for storage and transportation and to facilitate installation.

The foregoing specification sets forth specific structures in considerable detail for the purpose of exemplifying the invention and indicating modifications. It will be understood that various other modifications may be made by those skilled in the art without departing from the spirit of the invention or the scope of the following claims.

We claim:

1. A filter bottom module adapted to form a unitary part of a filter bottom, molded of plastic resin composition, comprising a thin-walled, reinforced, horizontal structural section including a horizontal wall, side walls joined thereto at its edges, and a plurality of vertical reinforcing ribs integral with said horizontal and side walls and extending in an intersecting pattern between said side walls to form a high-strength filter-bottom structural section adapted to sustain the weight of an overlying filter bed and withstand the upward pressure of backwash water from below, spaced legs joined to said section and extending downward therefrom to support the same above a tank bottom and provide an underlying water chamber, and means forming a plurality of nozzles distributed over the area of said structural section, for passing filtered water downward through said filter bottom and discharging backwash water upward through the same, said horizontal wall being molded with a plurality of openings therein to form water passages for said nozzles.

2. A filter bottom module as in claim 1 in which said horizontal wall is formed as the top wall of said section, with said integral ribs below said wall.

3. A filter bottom module as in claim 1 in which said horizontal wall is formed below the top of said structural section and said ribs extend upward therefrom to define a plurality of separate upward-open cells distributed over the horizontal wall, means to form a filter bed supporting surface above said horizontal wall, nozzle distribution apertures extending through said surface-forming means to pass backwash water from said cells to the overlying filter bed, and control orifices formed in said horizontal wall to pass backwash water to the cells from below.

4. A filter bottom module adapted to form a unitary part of a filter bottom to sustain the weight of an overlying filter bed and the upward pressure of backwash water from below, molded of plastic resin composition, comprising a thin-walled, reinforced, horizontal structural section, including a molded top wall, side walls joined thereto at its edges, and a plurality of reinforcing ribs below said wall and integral therewith, extending between and joined to said side walls, to support itself both against the weight of an overlying filter bed and against upward backwash pressure, spaced legs joined to said top wall and extending downward therefrom to support the same above an underlying tank bottom and to provide a water chamber beneath the filter bottom, and a plurality of nozzles uniformly distributed over said top wall for passing filtered water downward to said water chamber and for discharging backwash water upward from said water chamber into the filter bed, each of said nozzles having at least one element thereof molded in as an integral part of the molded module.

5. A filter bottom module as in claim 4 which includes means to hold the module down to the tank bottom to resist lifting force of upward backwash pressure.

6. A filter bottom as in claim 5 in which said top wall is rectangular and has downward extending legs at its corners, each corner being molded with a downward offset shoulder overlying the leg at said corner, said offsets being such that at the meeting corners of four adjoining modules the offsets combine to form a recess for the reception of the upper end of a hold-down bolt and the shoulders thereof form a platform for hold down engagement by the bolt.

7. A filter bottom as in claim 6 which includes at least one additional leg at an intermediate position between corner legs, said section being formed at said leg to pass a hold-down bolt and to provide a recess with a downward-offset platform therein for at least partial engagement by a hold-down fastener.

8. A filter bottom module as in claim 7 which includes such an additional leg and recess and shoulder at the center of the top section of the module.

9. A filter bottom module as in claim 7 which includes such an additional leg and recess at an intermediate point along at least two opposite sides of the top section.

10. A filter bottom module as in claim 9 in which the side legs are at the side edges of the top section and the recesses formed thereat are outward open notches, each adapted to mate with a corresponding notch of an adjoining module to form a complete bolt-receiving recess between the two modules.

11. A filter bottom module as in claim 7 in which the legs at the periphery of the module are splayed outward to overlap the sides of the top section of an underlying similar module in stacked relation, and each leg inward of said sides extends downward from a recess formed in said top wall and is shaped to nest within the corresponding recess of the underlying similar module.

12. A filter bottom module as in claim 4 which includes an outward extending flange along at least one side of the module and a depending edge along another side thereof adapted to overlie the flange of an adjoining module to close the joint between the adjoining modules.

13. A filter bottom module as in claim 4 further comprising interlocking means formed on the module for interlocking adjoining modules to each other in a filter bottom.

14. A filter bottom module as in claim 13 in which the module is rectangular in plan and said interlocking means comprises an upward open channel along each of two sides of the module, and a depending edge along each of the other sides thereof adapted to enter the channels of adjoining modules to interlock the modules together.

15. A filter bottom module as in claim 14 in which each channel has its outer edge spaced outward from the side face of the module and is adapted to receive the depending edge of the adjoining module with the sides of the modules in spaced relation, said sides and channel thereby forming a trough for the reception of sealing compound between the adjoining modules.

16. A filter bottom as in claim 4 in which the module is rectangular in plan and further comprises an outward extending ledge along each of two sides of the module, below the top thereof, the other two sides of the module having bottom edges shaped to closely overlie said ledges of adjoining modules, a plurality of said modules being thereby adapted to be placed in adjoining relation with the ledges of one under-lying the said bottom edges of adjoining modules and with the sides of the modules in spaced relation to define troughs closed at the bottom by the ledges for the reception of sealing compound.

17. A filter bottom as in claim 16 in which said ledges are along adjoining edges of the module.

18. A filter bottom module as in claim 17 in which legs are formed integrally with the module at its corners, said ledges along said two adjoining sides being formed at corners of the module to pass hold down bolts for the module.

19. A filter bottom module as in claim 4, wherein said supporting legs comprise downward-extending walls along two opposite sides of the reinforced section to form therewith a downward open channel, and a bottom pan joined to said downward extending walls to close the open bottom of said channel, and means at each end of the module to engage the opposite end of an adjoining module for joining adjacent modules end-to-end.

20. A filter bottom module as in claim 4 in which legs are formed integrally with the side walls at the corners of the module and extend downward therefrom.

21. A filter bottom module as in claim 4 in which legs are formed at the corners integral with the side walls of the module, said side walls being formed with bottom edges having end portions adjacent the bottom of the legs and intermediate portions elevated above the bottoms of the legs, and ledges extending outward at two sides of the module in position to closely underlie the bottom edges of other sides of similar modules in adjoining position.

22. A filter bottom module as in claim 21 with the addition that said ledges have upstanding flanges at their outer ends to form upward open channels, and the said bottom edges of the other sides are shaped for reception in said channels to interlock adjoining modules together.

23. A filter bottom module as in claim 21 in which the ledges are wide ledges adapted to bridge the space between narrowly spaced adjoining modules and thereby form with the sides thereof a trough for the reception of sealing compound.

24. A filter bottom module as in claim 4 in which said top wall is rectangular and has legs at the corners thereof and at least one leg at an intermediate position between corner legs.

25. A filter bottom module as in claim 24 which has a leg at its center.

26. A filter bottom module as in claim 4 which includes a supporting leg inward of its sides, said leg being formed as a hollow post open through the said top wall, and nozzle distribution apertures formed about and outward of the periphery of said post.

27. A filter bottom module as in claim 26 in which the outer periphery of said post is spaced from surrounding wall areas to define one or more control orifices for passage of water between the water chamber below the module and said distribution apertures.

28. A filter bottom module as in claim 4 in which said nozzles comprise a central plate spaced upward from surrounding wall areas to define lateral distribution apertures therebetween.

29. A filter bottom as in claim 28 in which at least one of said nozzles includes a hollow post extending downward from said plate to form a supporting leg for the module.

30. A filter bottom module as in claim 28 in which said nozzle plate is at the intersection of reinforcing ribs which integrally join the plate to support the same.

31. A filter bottom module as in claim 4 in which said nozzles include a control orifice to receive backwash water from the space below said top section and distribution apertures to discharge said water to the space above said top wall.

32. A filter bottom module as in claim 31 in which the distribution apertures are formed in the molding of the module.

33. A filter bottom module as in claim 31 in which the control orifices are formed in the molding of the module.

34. A filter bottom module as in claim 33 in which the nozzle structure comprises an opening formed in the top wall of said horizontal section to provide a control orifice therethrough, and a diffusion unit secured to said wall over said opening to receive backwash water therefrom, said diffusion unit being provided with laterally directed distribution apertures about its periphery.

35. A filter bottom module as in claim 34 in which said opening formed in the top wall is of keyhole shape, and said diffusion unit has a key-head engaged in said hole to lock the unit in place, a portion of said hole remaining open to provide the control orifice.

36. A filter bottom module as in claim 34 in which the diffusion unit is formed with latch projections at its periphery and said top wall is formed with keeper slots in which said projections are engaged.

37. A filter bottom module as in claim 34 in which the top wall has fastener inserts molded therein and said diffusion unit is mounted by means of fasteners engaged in said inserts.

38. A filter bottom module as in claim 31 in which both said orifice and said apertures are formed in the molding of the module.

39. A filter bottom module as in claim 31 in which the nozzle structure comprises a collar integral with said top wall and defining an opening therethrough, a plate integrally joined to the collar by spaced ribs or the like and spaced from the collar to define laterally directed distribution apertures between the plate and the adjacent structure, and an insert closing said collar opening and defining a control orifice leading to said distribution orifices.

40. A filter bottom module as in claim 39 in which said collar and insert are respectively formed with bayonet slots and lugs which interfit to lock the insert in place.

41. A filter bottom module as in claim 39 in which the collar is connected to the adjacent top wall by a border area of outwardly upward slope which disposes the collar below the level of said top wall, and said plate is substantially coplanar with the top wall, whereby the top of the module presents a substantially flat face.

42. A filter bottom module as in claim 31 in which said nozzle structure comprises an imperforate wall upstanding above said top wall of said molded section, a series of upstanding slot-forming ribs spaced along said side wall and projecting outward therefrom to define a series of outward extending slots, and a control orifice formed adjacent said side wall in communication with each said slot at the inner edge thereof, each slot being open outward to form a discharge aperture at its outer end and providing a diffusion passage from said orifice to said aperture.

43. A filter bottom module as in claim 42 in which said slot-forming ribs are joined to the upstanding wall over substantially their enter height, and the orifice for each slot is formed as an individual opening through the top wall at the base of the upstanding wall.

44. A filter bottom module as in claim 42 in which at least some of said ribs are spaced outward from said upstanding wall to define a water flow passage between their inner edges and said wall, said passage extending through the plane of the top wall of said horizontal section to form a control orifice therethrough.

45. A filter bottom module as in claim 44 in which the upstanding wall extends downward through the plane of said top wall and is surrounded therebelow by a collar spaced therefrom to define an elongated narrow extension of said control orifice passage.

46. A filter bottom module as in claim 4 in which said nozzle structure comprises wide spaced ridges formed above the top wall of the module, said ridges having laterally open slots extending longitudinally along their sides, and having bottom cavities communicating with said slots at spaced points along their length to define orifices for supplying backwash water thereto from below.

47. A filter bottom module as in claim 4 in which the nozzles have laterally directed distribution apertures, are countersunk into said top wall to provide a substantially flat top face on said wall, and are bordered by outwardly upward sloping walls.

48. A filter bottom module as in claim 4 in which said nozzles are circular and include a circumferential series of distribution apertures directed radially outward about the entire peripheries of the nozzles.

49. A filter bottom module as in claim 4 in which said nozzles are of rectangular shape in plan and have distribution apertures at both their ends and their sides, said apertures being arranged in parallel rows in staggered relation with the apertures of one row discharging toward the spaces of an adjacent row.

* * * * *

UNITED STATES PATENT OFFICE
CERTIFICATE OF CORRECTION

Patent No. 3,762,559    Dated October 2, 1973

Inventor(s)  Maurice G. Knoy et al.

It is certified that error appears in the above-identified patent and that said Letters Patent are hereby corrected as shown below:

Col 1, Line 34 - Change "prevent" to --resist--.

Col 17, Line 17 - Change "top wall" to --horizontal section--.

Line 31 - Change "top wall" to --horizontal section--.

Line 61 - Delete "of the top section".

Line 64 - Change "top wall" to --horizontal section--.

Col 19, Line 9 - Change "top wall" to --horizontal section--.

Line 37 - Change "top" to --horizontal--.

Signed and sealed this 2nd day of April 1974.

(SEAL)
Attest:

EDWARD M.FLETCHER,JR.
Attesting Officer

C. MARSHALL DANN
Commissioner of Patents